3,366,166
CONDITIONING APPARATUS
Karl M. Gerteis, Cazenovia, N.Y., assignor to Carrier Corporation, Syracuse, N.Y., a corporation of Delaware
Filed July 1, 1965, Ser. No. 468,838
4 Claims. (Cl. 165—29)

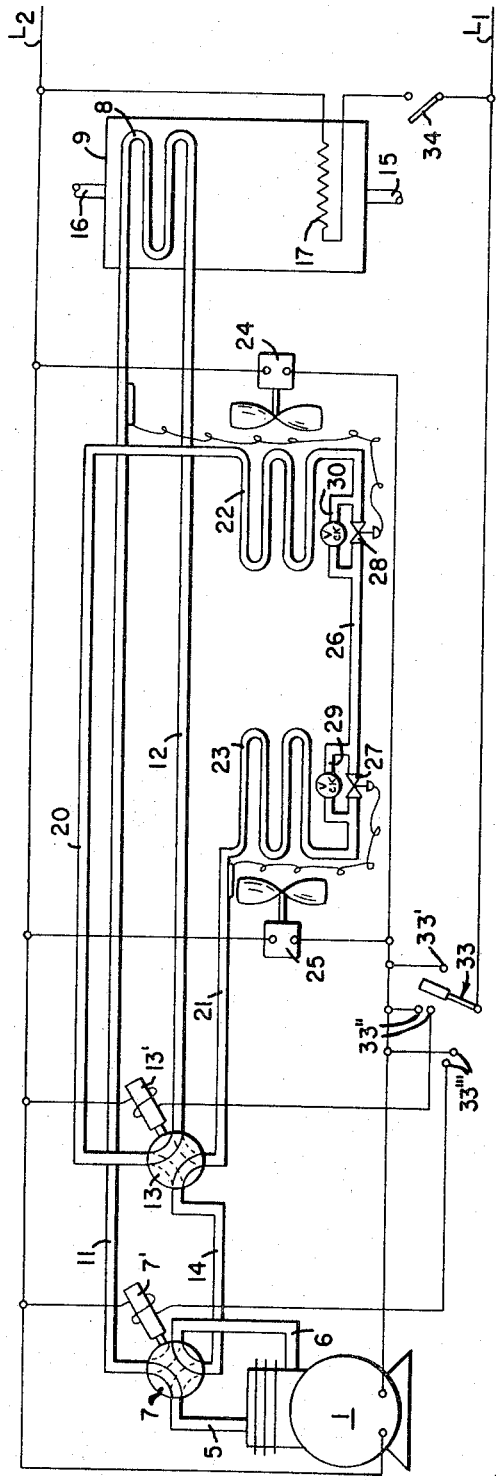

ABSTRACT OF THE DISCLOSURE

Combined heat pump and water heating system, the system including a water heating coil and a pair of reversing valves, said valves being adapted when in a first position to cause the system to simultaneously cool the area being conditioned while heating water, upon reversal of one of said valves to cause the system to simultaneously heat both the area being conditioned and the water, and upon reversal of the other of said valves to cause the system to heat the area being conditioned by heat extracted from the water.

---

This invention relates to a refrigeration apparatus and, more particularly, to a refrigeration apparatus adapted to heat water.

The inherent advantages of low cost, minimum complexity, and compactness of an integrated unit, particularly for use in homes, which may, during the warmer months, cool and dehumidify the home, and during the colder months, heat the home, and additionally satisfy at least a portion of the hot water demands of the home has long attracted interest. While integrated units designed to accomplish the above objects have been proposed, none has met with any degree of appreciable success.

It is a principal object of the present invention to provide a new and improved apparatus for conditioning an enclosure and heating water.

It is an object of the present invention to provide an air conditioning apparatus which salvages heat rejected by the air conditioning system for the purpose of heating service water.

It is an object of the present invention to provide an apparatus for conditioning an area effective during cooling operation to utilize the heat removed from the area being conditioned to heat a body of water, and effective during heating cycle operation to employ the body of water as a source of heat for the area being conditioned.

This invention relates to a conditioning apparatus comprising, in combination, a compressor having suction and discharge sides, expansion means, a first heat exchanger connecting the compressor discharge side with the expansion means, and a second heat exchanger in heat exchange relation with a first fluid medium connecting the expansion means with the compressor suction side to form a closed refrigeration system, the first fluid medium being usable to condition the area; a third heat exchanger disposed in heat exchange relation with a second fluid medium to be conditioned connected between the first exchanger and the compressor discharge side whereby upon operation of the compressor, the system cools the first medium while heating the second medium; and a first reversing valve effective when energized to connect the third heat exchanger with the second heat exchanger and the first heat exchanger with the compressor suction side whereby the system, upon operation of the compressor, simultaneously heats the first and second mediums.

Other objects and advantages of the present invention will be apparent from the ensuing description and drawing in which:

The figure is a diagrammatic view showing a reverse cycle refrigeration system according to the present invention.

Referring to the drawing there is shown a refrigeration system in which lines 5, 6 connect the discharge and suction sides of refrigerant compression means 1 with a suitable reversing valve 7. Compression means 1 may, for example, be a reciprocating compressor.

A suitable water heating coil 8, disposed in heat exchange relation with a medium to be heated such as water held within water storage vessel 9, is series connected by lines 11, 12 with reversing valves 7, 13 respectively. Line 14, interconnected between reversing valves 7, 13, bypasses coil 8. Reversing valves 7, 13 may comprise any suitable commercially available valve. Solenoid operators 7', 13' are preferably provided therefor.

Vessel 9 communicates with a suitable source of supply water by means of conduit 15. Conduit 16 transmits hot water from vessel 9 to a place of use such as a suitable hot water heater (not shown). A suitable heating means, such as electric resistance heater 17 is provided. Heater 17 is disposed adjacent the bottom of vessel 9.

Vessel 9 serves, during periods when the refrigeration system is operated on the cooling cycle as a hot water preheater and during periods when the refrigeration system is operated on the heating cycle as a heat source, supplementing, as needed, the heat extracted from the ambient by the refrigeration system. Resistance heater 17, operated, preferably, during off-peak hours, as for example, at night, replenishes heat extracted from the water in vessel 9.

Refrigerant lines 20, 21 connect reversing valve 13 with heat exchanger coils 22, 23 respectively. Coil 22 is preferably disposed outdoors. Fan 24, when operated, forces outdoor ambient air across coil 22.

Heat exchanger coil 23 is disposed within or in communication with the area to be conditioned, such as a home. Fan 25, when operated, forces air to be conditioned into heat exchange relation with coil 23, the conditioned air being thereafter discharged directly or by means of suitable ductwork (not shown) into the area being conditioned.

Refrigerant line 26 connects coil 22 to coil 23. Line 26 includes suitable refrigerant expansion means, such as paired thermal-type expansion valves 27, 28. Check valve control lines 29, 30 are adapted to bypass valves 27, 28, respectively, during cooling and heatnig cycle operation respectively.

With reversing valves 7, 13 in the position shown by the solid line in the drawing, on a demand for cooling, thermostat 33 closes contact 33' to complete energizing circuits, from leads $L_1$, $L_2$, to compressor 1, outdoor fan 24 and indoor fan 25. Gaseous refrigerant discharged from compressor 1 passes via line 5, reversing valve 7 and line 11 into coil 8 where the thermal transfer between coil 8 and the water in vessel 9 heats the water and condenses refrigerant within coil 8. Refrigerant from coil 8 passes through line 12, reversing valve 13 and line 20 into outdoor coil 22 where outdoor air brought into heat exchange relation with coil 22 by fan 24, further condenses the refrigerant. Liquid refrigerant from coil 22 passes by means of bypass line 30 and expansion valve 27 into indoor coil 23 where the thermal transfer between air to be conditioned, brought into heat exchange relation with coil 23 by fan 25, and the refrigerant in coil 23 cools the air. The cooled air is thereafter distributed into the area being conditioned.

Refrigerant from coil 23 returns by means of line 21, valve 13, line 14, valve 7 and line 6 to compressor 1 to complete the refrigerant circuit.

On a demand for heat, thermostat 33 closes low stage heating contacts 33" to complete energizing circuits to compressor 1, reversing valve solenoid 13', outdoor fan 24 and indoor fan 25. Energization of solenoid 13' moves reversing valve 13 to the dotted line position in the figure whereby refrigerant from coil 8 is passed through line 21 into indoor coil 23. Air flowing across coil 23 into the area being conditioned is heated while refrigerant in coil 23 is condensed. Condensed refrigerant from coil 23 passes via bypass line 29 and expansion valve 28 into outdoor coil 22. There the refrigerant is vaporized by outdoor air flowing thereacross under the influence of fan 24, the refrigerant returning via line 20, valve 13, line 14, valve 7 and line 6 to compressor 1.

During the low stage heating operation, the refrigeration system heats water in vessel 9 and heats the area being conditioned. It is understood that in this circumstance, the amount of heat which the system is capable of supplying to the area being conditioned is limited.

On a further demand for heat, thermostat 33 closes contact 33''' to complete energizing circuits to compressor 1, reversing valve solenoid 7', outdoor fan 24 and indoor fan 25. Reversing valve solenoid 13' is not energized and valve 13 reverts to the solid line position in the figure.

Solenoid 7' moves reversing valve 7 to the dotted line position in the figure wherein refrigerant discharged from compressor 1 through line 5 is directed by valve 7 through line 14, valve 13 and line 21 to indoor coil 23 where the thermal transfer between coil 23 and the air being conditioned heats the air while condensing the refrigerant. The heated air is directed to the area being conditioned.

Condensed refrigerant from coil 23 passes via bypass line 29 and expansion valve 28 into outdoor coil 22 where heat extracted from the outdoor air passed across coil 22 vaporizes the refrigerant. Refrigerant from outdoor coil 22 passes though line 20, reversing valve 13 and line 12 into coil 8 where additional heat is extracted from the water in vessel 9 to further vaporize the refrigerant. Refrigerant from coil 8 returns through line 11, valve 7 and line 6 to compressor 1.

During the high or second stage heating cycle, the refrigeration system utilizes the body of water in vessel 9 as a source of heat to supplement heat derived from the outdoor air. Where outdoor air temperatures are relatively low, the amount of heat drawn by the system from the body of water is relatively large.

Switch 34, when closed, completes an energizing circuit to resistance heater 17. Heater 17 is preferably energized during off-peak electrical demand hours to take advantage of more favorable electrical rates generally offered by power companies. To insure use of resistance heater 17 during off-peak hours a suitable timer controlled operator (not shown) may be provided for switch 34.

By the present system, heat normally wasted during cooling cycle operation of a refrigeration system is utilized to heat water for domestic use. During heating cycle operation, the refrigeration system utilizes a body of water having an independent heating means to supplement heating demands of the area being conditioned.

While I have described preferred embodiments of the present invention, it is understood that this invention may be otherwise embodied within the scope of the following claims.

I claim:

1. In an apparatus for conditioning an area, the combination of a compressor having suction and discharge sides, expansion means, a first heat exchanger connecting said compressor discharge side with said expansion means, and a second heat exchanger in heat exchange relation with a first fluid medium connecting said expansion means with said compressor suction side to form a closed refrigeration system, said first fluid medium being usable to condition said area; a third heat exchanger disposed in heat exchange relation with a second fluid medium to be conditioned connected between said first exchanger and said compressor discharge side whereby upon operation of said compressor, said system cools said first medium while heating said second medium; a first reversing valve effective when energized to contact said third heat exchanger with said second heat exchanger and said first heat exchanger with said compressor suction side whereby said system, upon operation of said compressor, simultaneously heats said first and second mediums and a second reversing valve effective when energized to connect said compressor discharge side directly to said second heat exchanger and to connect said first heat exchanger through said third heat exchanger to said compressor suction side whereby said system, upon operation of said compressor, heats said first medium from said second medium.

2. Apparatus according to claim 1 including control means responsive to a predetermined first heating demand of said area to actuate said first reversing valve, said control means being responsive to a predetermined second heating demand of said area to actuate said second reversing valve and deenergize said first reversing valve.

3. Apparatus according to claim 2 including auxiliary heating means for said second fluid medium.

4. In a refrigeration system, the combination of a compressor having discharge and suction sides; a first outdoor heat exchanger connected to said compressor discharge side; a second indoor heat exchanger connected to said compressor suction side, said indoor heat exchanger being disposed in heat exchange relation with a first medium to be conditioned; expansion means connecting said outdoor heat exchanger with said indoor heat exchanger whereby upon operation of said compressor said system cools said first medium; a third heat exchanger connected between said compressor discharge side and said first outdoor heat exchanger, said third heat exchanger being arranged in heat exchange relation with a second medium to be conditioned whereby upon actuation of said compressor said second medium is heated; first reversing means effective when actuated to connect said compressor discharge and suction sides with said indoor and outdoor heat exchangers, respectively, whereby upon actuation of said compressor said system heats said first and second mediums; second reversing means effective when actuated to bypass refrigerant discharged from said compressor around said third coil into said second heat exchanger while connecting said first heat exchanger through said third heat exchanger with said compressor suction side whereby upon actuation of said compressor said system heats said first medium from said second medium; and control means for said first and second reversing means responsive to the system demand adapted to a first predetermined system demand to actuate said first reversing means whereby said system simultaneously heats said first and second mediums, said control means being adapted at a second predetermined system demand to actuate said second reversing means whereby said system heats said first medium from said second medium.

References Cited

UNITED STATES PATENTS

| | | | |
|---|---|---|---|
| 1,874,803 | 8/1932 | Reed | 165—29 |
| 2,619,326 | 11/1952 | McLenegan | 165—29 |
| 3,017,162 | 1/1962 | Haines et al. | 165—29 |

ROBERT A. O'LEARY, *Primary Examiner.*

CHARLES SUKALO, *Examiner.*

UNITED STATES PATENT OFFICE
CERTIFICATE OF CORRECTION

Patent No. 3,366,166                                      January 30, 1968

Karl M. Gerteis

It is hereby certified that error appears in the above numbered patent requiring correction and that the said Letters Patent should read as corrected below.

Column 2, line 46, for "heatnig" read -- heating --; column 4, line 6, for "contact" read -- connect --; line 54, for "to", first occurrence, read -- at --.

Signed and sealed this 10th day of May 1969.

(SEAL)
Attest:

Edward M. Fletcher, Jr.
Attesting Officer

WILLIAM E. SCHUYLER, JR.
Commissioner of Patents